United States Patent

Laramay et al.

[19]

[11] Patent Number: 6,089,318

[45] Date of Patent: Jul. 18, 2000

[54] METHOD FOR CONTROL OF FLUID LOSS AND GAS MIGRATION IN WELL CEMENTING

[75] Inventors: Steven B. Laramay, Mesquite; Rebecca G. Udarbe, Garland; Charles R. George, Sachse, all of Tex.

[73] Assignee: Fritz Industries, Inc., Mesquite, Tex.

[21] Appl. No.: 09/373,016

[22] Filed: Aug. 11, 1999

Related U.S. Application Data

[63] Continuation-in-part of application No. 09/092,294, Jun. 5, 1998, which is a continuation-in-part of application No. 08/964,622, Nov. 5, 1997, Pat. No. 5,988,279.

[51] Int. Cl.$^7$ .......................... E21B 33/138; E21B 33/14
[52] U.S. Cl. .......................... 166/293; 106/696; 106/725; 106/727; 106/823; 166/295; 524/3; 524/5
[58] Field of Search .................................... 166/293, 294, 166/295; 106/696, 708, 724, 725, 727, 728, 781, 790, 823; 524/3, 5

[56] References Cited

U.S. PATENT DOCUMENTS

| | | | |
|---|---|---|---|
| 3,116,264 | 12/1963 | Wahl | 166/293 X |
| 3,943,996 | 3/1976 | Guilbault et al. | 166/293 |
| 4,015,991 | 4/1977 | Persinski . | |
| 4,107,057 | 8/1978 | Dill . | |
| 4,404,111 | 9/1983 | Bi . | |
| 4,515,635 | 5/1985 | Rao . | |
| 4,555,269 | 11/1985 | Rao . | |
| 4,587,283 | 5/1986 | Hillo et al. | 524/3 |
| 4,602,685 | 7/1986 | McKenzie | 166/293 |
| 4,610,306 | 9/1986 | Reese | 166/293 |
| 4,652,623 | 3/1987 | Chen | 526/287 |
| 4,676,317 | 6/1987 | Fry | 166/293 |
| 4,703,801 | 11/1987 | Fry | 166/293 |
| 4,726,906 | 2/1988 | Chen . | |
| 4,743,301 | 5/1988 | Ito et al. | 524/5 |
| 4,951,921 | 8/1990 | Stahl et al. | 166/285 X |
| 5,028,271 | 7/1991 | Huddleston | 106/720 |
| 5,116,421 | 5/1992 | Ganguli et al. | 106/823 |
| 5,134,215 | 7/1992 | Huddleston | 527/400 |
| 5,147,964 | 9/1992 | Huddleston | 527/400 |
| 5,153,240 | 10/1992 | Stephens | 524/3 |
| 5,336,316 | 8/1994 | Dawson | 106/724 |
| 5,339,903 | 8/1994 | Eoff | 166/293 |
| 5,855,244 | 1/1999 | Ahmed et al. | 166/295 |

OTHER PUBLICATIONS

The Relationship of Thickening Time, Gel Strength, and Compressive Strength of Oilwell Cements, SPE Paper #11205, SPE Production Engineering, Mar. 1986, pp. 143–152, Sabins et al.

*Primary Examiner*—George Suchfield
*Attorney, Agent, or Firm*—Thomas R. Weaver

[57] ABSTRACT

This invention discloses a polymer composition, a cement slurry containing said polymer composition and a method of using the cement slurry to cement a borehole penetrating a subsurface earth formation wherein the polymer composition is made by polymerizing a vinylamide morpholine derivative with a styrene sulfonic acid salt in the presence of a humate. The polymer composition operates to reduce fluid loss from the cement slurry to the subsurface formation.

9 Claims, No Drawings

METHOD FOR CONTROL OF FLUID LOSS AND GAS MIGRATION IN WELL CEMENTING

This is a continuation-in-part of application Ser. No. 09/092,294 filed Jun. 5, 1998, which is a continuation-in-part of application Ser. No. 08/964,622 filed Nov. 5, 1997, now U.S. Pat. No. 5,988,279.

BACKGROUND OF THE INVENTION

1. Field of The Invention

This invention broadly relates to a method of cementing wells which penetrate subterranean formations with a slurry of hydraulic cement in water. The invention further relates to an improved composition for use in well cementing, whereby loss of fluid from the slurry is reduced and movement of gas into the slurry from a subterranean formation adjacent the slurry is substantially reduced, if not eliminated. The invention still further relates to an improved method of making the improved composition.

2. Related Art and Problem Solved

It is known in the art of well cementing to form a sheath of hardened cement in the annular space between a well pipe, such as a casing, and the walls of a wellbore which penetrates a subterranean formation wherein the purpose of the sheath is to support the casing in the wellbore and to prevent the undesirable movement of formation fluids, i.e., oil, gas and water, within the annular space between subsurface formations and/or to the surface of the earth. The process of forming the sheath is referred to in the art as primary cementing.

Thus, in the art of primary cementing, a slurry of hydraulic cement in water is made, the slurry is pumped down the casing and circulated up from the bottom thereof in the annulus to a desired location therein and then permitted to remain undisturbed—static—in the annulus for a time sufficient to enable the hydraulic cement to react with the water in the slurry, i.e., to set, to thereby produce the sheath of hardened cement.

The slurry of cement, when first placed in the annulus, acts as a true liquid and will, therefore, transmit hydrostatic pressure. Thus, sufficient hydrostatic pressure is exerted, as an element of the process of primary cementing, to balance the pressure of any gas in the formation to prevent the movement of gas from the formation into and through the slurry in the annulus. Movement of gas from a formation into and through a cement slurry in an annulus is referred to in the art as gas migration.

Gas migration can result in movement of gas in the slurry from one formation to another or even to the surface of the earth. Such movement can cause loss of control of pressure and result in a blowout. As mentioned previously, gas migration can be controlled if sufficient pressure can be transmitted through the slurry. However, loss of control can be experienced and gas migration can occur if the slurry does not possess the properties of a true liquid and is unable to transmit hydrostatic pressure.

Before a slurry of hydraulic cement sets into a hardened mass having compressive strength, events take place which cause the slurry to lose the ability to transmit hydrostatic pressure. One of the events is the loss of liquid from the slurry to the formation. Another event is the development of static gel strength in the slurry.

It is clear that the loss of water from a slurry of hydraulic cement employed in a well cementing operation will diminish the ability of the slurry to transmit hydrostatic pressure. The ability to control water loss becomes more difficult as the temperature increases, especially at temperatures greater than about 200 degrees F. It is, thus, an object of this invention to provide an improved composition for use in well cementing, whereby water loss from a slurry of hydraulic cement containing the improved composition is reduced at temperatures up to and greater than about 200 degrees F. It is a still further object of this invention to provide an improved method of making the improved composition.

When a slurry of hydraulic cement becomes static it begins to develop a property known in the art as static gel strength, or simply gel strength. (In this regard, note Sabins, et al., "The Relationship of Thickening Time, Gel Strength, and Compressive Strength of Oil well Cements," SPE Production Engineering, March 1986, pages 143–152.)

Gel strength is not compressive strength. Thus, as a slurry of hydraulic cement sets into a hardened mass having compressive strength, it is believed that the hardening process experiences phases which are relevant to the phenomenon of gas migration. (See Eoff et al, U.S. Pat. No. 5,339,903.) In the first phase of the process, it is believed that the slurry contains sufficient liquid to enable the slurry to possess the characteristics of a true liquid. Accordingly, during the first phase, the slurry can transmit hydrostatic pressure and gas migration can be prevented by applying sufficient hydrostatic pressure which is transmitted against a gas-containing formation to thereby prevent the movement of gas from the formation into the slurry.

During the first phase of the process, some of the liquid in the slurry is lost—this is referred to as fluid loss—and the slurry begins to stiffen due to the formation of a gel structure. During this first phase, even though fluid loss and gel formation do occur, it is believed that the setting cement retains the ability to transmit hydrostatic pressure. Accordingly, gas migration can be prevented so long as the slurry exhibits the properties of a true liquid and so long as the stiffness of the gel structure—referred to as gel strength—is less than or equal to a certain value which has been referred to in the art as the first critical value. The first critical value is believed to be about 100 $lb_F$/100 sq.ft.

In the second phase of the hardening process, the gel strength of the slurry exceeds the first critical value and continues to increase and fluid loss may continue, although at a rate much lower than that experienced in the first phase. During the second phase, it is believed that the setting cement loses the ability to transmit full hydrostatic pressure. Accordingly, gas migration may not be prevented during the second phase because the gel strength of the slurry may be too high to permit full transmission of hydrostatic pressure, but too low to resist pressure exerted by gas in the formation against the slurry. This condition exists until the gel strength increases to a value, referred to in the art as the second critical value, which is high enough to resist pressure exerted by gas in the formation against the slurry. The second critical value is believed to be about 500 $lb_F$/100 sq.ft.

In the third phase of the hardening process, gas migration is prevented because gel strength is equal to or greater than the second critical value. The cement continues to harden until it attains a compressive strength deemed sufficiently high to enable further operations in the wellbore.

It is noted that Sabins, et al., mentioned above, provide a discussion and a description of a method and apparatus to experimentally determine gel strength value.

In view of the above, in order to minimize gas migration, it is desirable that maximum fluid loss, if any, should occur prior to the beginning of the second phase of the cement hardening process; that the first phase should continue over an extended period of time; and that the second phase should be completed in a short period of time.

The period of time required for a slurry of hydraulic cement to attain the first critical value from the time the slurry becomes static has been defined in the art as "Zero Gel Time," and the period of time required for a slurry to attain the second critical value from the time it attains the first critical value has been defined in the art as "Transition Time."

It is, thus, another object of this invention to provide a composition for and a method of extending Zero Gel Time of a slurry for a time sufficient to enable the rate of fluid loss from the slurry to decline to a substantially constant value and to shorten Transition Time.

It is a further object of this invention to provide a method of cementing a wellbore which penetrates a gas-containing subterranean formation, whereby gas migration at temperatures up to 400° F. and particularly above 200° F. is reduced if not eliminated.

It is still another object of this invention to provide an improved process of making the composition of this invention, whereby the product of the improved process operates to enhance the results obtained when using the product of the improved process to reduce fluid loss from a slurry of hydraulic cement.

It is yet another object of this invention to provide the product of the improved process.

A cement having an extended Zero Gel Time, the provision of which is a stated object of this invention, is referred to herein as a "low gel strength cement." It is believed, in addition to the use in primary cementing as described above, that a low gel strength cement finds particular use in remedial cementing practices such as in placement thereof by coil tubing and by dump bailer.

SUMMARY OF THE INVENTION

It has now been discovered that the random copolymerization of a vinylamide morpholine derivative with a styrene sulfonic acid salt, when performed in the presence of a humate, provides a polymer composition which, when added to a slurry of hydraulic cement made with either fresh or salt water, and more particularly salt water, is effective to reduce fluid loss from and modify the gel strength of the slurry. It is believed that the polymer composition can effectively modify the fluid loss from and gel strength of a slurry of hydraulic cement at temperatures of up to about 400° F. The fluid loss control and gel strength modification properties of the polymer composition render the composition very useful in a method of cementing a wellbore which penetrates a subterranean gas-containing formation whereby migration of gas from the formation into and through the slurry in the wellbore is reduced.

The vinylamide morpholine derivatives useful herein are selected from compounds represented by the general formula

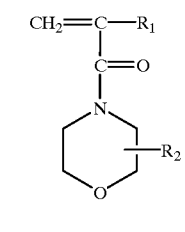

The polymerizable styrene sulfonic acid salts useful herein are selected from compounds represented by the general formula:

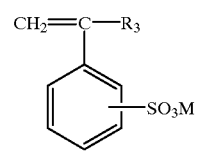

wherein $R_3$ is —H and M is —Na, —K, —NH$_4$, or —Ca½.

The material referred to above as a "humate" is a generalization for any naturally occurring derivative of humic acid. Humic acids are allomelanins found in soils, coals and peat, resulting from the decomposition of organic matter, particularly dead plants, and consist of a mixture of complex macromolecules having a polymeric phenolic structure.

A humate useful herein, available from American Colloid Company under the trademark ENERSOL SC, is described as comprising a long chain, highly substituted, molecular structure derived from humic acids whose active ingredients are potassium humate and humic acid. ENERSOL SC humate is substantially (95–100%) water soluble and is known as a plant nutrient activator.

The polymer composition of this invention is, thus, a random copolymer which is comprised of the product of the process of reacting, in the presence of a humate, a monomer selected from compounds within the scope of formula (1), the vinylamide morpholine derivative, with at least one monomer selected from compounds within the scope of formula (2), the styrene sulfonic acid salt.

The polymerization reaction can also include other acrylic derivatives.

The polymer composition of this invention is sometimes referred to herein as the gel strength modifier/fluid loss additive of this invention.

The improved method of this invention for making the polymer composition, in broad terms, comprises: first, forming an aqueous monomer solution comprising a first monomer selected from a vinyl morpholine derivative, as defined, at least one second monomer selected from a styrene sulfonic acid salt derivative, as defined, and a humate; second, adjusting the temperature and pH of the monomer solution in the presence of a water soluble chain transfer agent; and, third, causing reaction to begin with a suitable initiator material.

The polymer composition of this invention, and the method of preparation thereof, should be distinguished from the method of making graft polymers and the resulting product. In this regard, grafting polymers on a natural product backbone is a known process. An example of the process is found in Fry, et al., U.S. Pat. No. 4,703,801 and Fry, et al. U.S. Pat. No. 4,676,317 each of which discloses a natural product backbone, lignin or lignite, having grafted thereto polymers including homopolymers and copolymers of 2-acrylamido-2-methylpropanesulfonic acid and N,N-dimethylacrylamide. The Fry, et al., polymer graft is disclosed to be useful in a cementing composition as a fluid loss additive. Fry, et al., do not mention modification of slurry gel properties, zero gel time, transition time or gas migration.

Eoff et al., U.S. Pat. No. 5,339,903, disclose grafting polymer groups to tannin, a natural product backbone, wherein the polymer groups consist of at least two, and preferably three, vinylamide derivatives. Eoff et al. do mention modification of slurry gel properties, zero gel time, transition time and gas migration.

Another example of the use of a polymer grafted natural product backbone in a well cementing composition is provided in Huddleston, et al., U.S. Pat. No. 5,134,215 and Huddleston, et al., U.S. Pat. No. 5,147,964. Huddleston, et al., each discloses a wattle tannin backbone grafted with 2-acrylamido-2-methylpropanesulfonic acid or with 2-acrylamido-2-methylpropanesulfonic acid and acrylamide. Huddleston, et al., disclose their polymer-grafted tannin to be useful as a fluid loss additive in a cementing composition, but they do not mention modification of slurry gel properties, zero gel time, transition time or gas migration.

DESCRIPTION OF THE PREFERRED EMBODIMENTS

By this invention there is, thus, provided a process for making a polymer composition, the product of the process (referred to herein as the polymer composition), a hydraulic cement slurry composition containing the polymer composition and a method of using the hydraulic cement slurry composition to cement a pipe, such as a casing, in a wellbore, whereby fluid loss is reduced and gas migration in the cement slurry is eliminated, or at least substantially reduced.

Accordingly, the use in primary cementing of a hydraulic cement slurry composition containing the polymer composition, wherein conventional cement slurry placement techniques are employed to secure a pipe in a wellbore, results in low fluid loss from the slurry and eliminates, or at least substantially reduces, gas migration, i.e., the movement of gas, from the formation into and through the slurry.

As mentioned, gas migration is a problem to be avoided because it leads to communication by way of the well annulus between formations and/or to the surface and is, thus, a source of surface and subsurface blowouts.

Gas moving in a hardening cement slurry can create permanent channels in the set cement. The gas channels must be filled with cement in a separate remedial cementing technique called "squeezing" in order to prevent the communication mentioned above.

Gas migration is caused by the inability of the cement slurry placed in the zone adjacent the gas-containing formation to resist the pressure of the gas in the formation. Accordingly, the gas moves from the formation into and through the slurry.

The hydraulic cement slurry composition of this invention is formulated to provide a Zero Gel Time of greater than about one hour and a Transition Time of less than about one hour, whereby the time in which the hardening cement slurry can transmit hydrostatic pressure is maximized, and the time in which gas migration can occur is minimized. Furthermore, fluid loss from the hydraulic cement slurry composition of this invention is less than about 100 cc/30 minutes and maximum fluid loss is believed to occur during the Zero Gel Time period.

Cement slurries which do not contain gel strength modifiers, such as those disclosed and claimed herein, ordinarily have Zero Gel Times of much less than one hour. This means that the fluid loss rate from such a slurry will still be relatively high after the slurry has reached the second critical value. This high fluid loss rate combined with the inability of the gelled slurry to transmit hydrostatic pressure greatly increases the probability that gas migration will occur.

The hydraulic cement slurry composition of this invention comprises hydraulic cement, water, present in an amount in the range of from about 35 to about 60 percent water by weight of dry cement, and the polymer composition of this invention, present in an amount in the range of from about 0.1 to about 2.0, preferably 0.3 to about 1.0 and still more preferably from about 0.5 to about 0.8 percent polymer composition by weight of dry cement. Mix water concentrations greater than those mentioned can be employed in the presence of extenders and/or ultra fine and slag cements.

The slurry, in addition to the above ingredients, also preferably includes a high temperature set time retarder, such as sodium or calcium lignosulfonate or organic acids, such as citric, tartaric or gluconic acid, or mixtures of such acids and lignosulfonates, present in an amount in the range of from about 0.1 to about 2.0 percent retarder by weight of dry cement. Furthermore, a high temperature strength regression aid, such as silicon dioxide, can be present in the slurry in an amount in the range of from about 0 to about 40 percent by weight of dry cement. If desired, a weighting agent, such as hematite, may be included in the slurry in an amount in the range of from about 10 percent to about 60 percent by weight of dry cement.

As previously mentioned, the polymer composition is a random copolymer made by reacting, in the presence of a humate, a monomer selected from compounds within the scope of formula (1), the vinylamide morpholine derivative, with at least one monomer selected from compounds within the scope of formula (2), the styrene sulfonic acid salt.

The vinylamide morpholine derivatives useful herein are selected from compounds represented by the general formula:

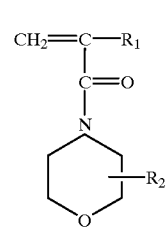

(1)

wherein $R_1$ is —H or —$CH_3$ and $R_2$ is —H, —$CH_3$ or —$CH_2CH_3$ and $R_2$ can be positioned on any one of the four carbons in the morpholine ring.

The polymerizable styrene sulfonic acid salts useful herein are selected from compounds represented by the general formula:

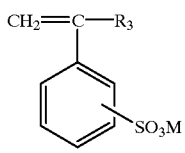

(2)

wherein $R_3$ is —H and M is —Na, —K, —NH$_4$, or —Ca½.

As previously mentioned, the polymerization reaction can also include other acrylic derivatives such as those selected from compounds represented by the general formula:

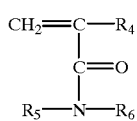

(3)

wherein $R_4$ is —H or —CH$_3$; $R_5$ is —H, —CH$_3$, —CH$_2$CH$_3$, —CH(CH$_3$)$_2$, —C(CH$_3$)$_3$ or —C(CH$_3$)$_2$CH$_2$SO$_3$X, X is —Na, —NH$_4$ or —Ca½; and $R_6$ is —H, —CH$_3$ or —CH$_2$CH$_3$.

In one preferred embodiment, the polymer composition of this invention consists essentially of the random copolymerization product of the vinylamide morpholine derivative and sodium styrene sulfonate.

The mole ratio of the vinylamide morpholine derivative to the styrene sulfonic acid salt employed in the process of making the polymer composition is an amount in the range of from about 2 to about 25, preferably from about 5 to about 20, and still more preferably from about 7 to about 15 moles of the vinylamide morpholine derivative per mole of the styrene sulfonic acid salt. In one preferred embodiment the process employs about 10 moles of the vinylamide morpholine derivative per mole of the styrene sulfonic acid salt.

The preferred vinylamide morpholine derivative is acryloylmorpholine, the preferred styrene sulfonic acid salt is sodium styrene sulfonate.

Some specific compounds within the scope of formula (1) believed to be useful herein include acryloylmorpholine and methacryloylmorpholine.

A specific compound within the scope of formula (2) believed to be useful herein is sodium styrene sulfonate.

Specific compounds within the scope of formula (3) believed to be useful herein include the sodium salt of 2-acrylamido-2-methylpropanesulfonic acid, acrylamide, methacrylamide, N-methylacrylamide, N-i-propylacrylamide, N-i-propylmethacrylamide, N-t-butylacrylamide, N-t-butylmethacrylamide, N,N-dimethylacrylamide and N,N-dimethylmethacrylamide.

The polymer composition of this invention is water soluble, and can be employed in the liquid or solid (dry) state.

The improved polymerization process of this invention can be conducted in any vessel (or series of vessels) of a size suitable to retain the volume of the reactants. The reactor vessel can be constructed of either glass or stainless steel and is preferably equipped with: a means for stirring and/or circulating the contents thereof; a temperature detecting device and a means for recording the detected temperature; inlets for introducing liquids, solids and gasses into the interior thereof; a pH detecting device and a means for displaying and recording the detected pH; and a means for heating and cooling the contents of the reactor.

In general, the improved polymerization process comprises dissolving all monomer reactants and humate in a quantity of deionized water sufficient to dissolve the monomer reactants and humate and to cool the reaction, which is highly exothermic, followed by initiating the polymerization reaction.

In one preferred embodiment, about 75 percent of the required deionized water is introduced into the reactor, the required quantity of base neutralizer, an alkali metal hydroxide, is added to the reactor and the water and base are mixed by stirring and/or circulation until the resulting solution of water and base is cooled to about 65° F.

The amount of deionized water added to the reactor to dissolve the monomer reactants and humate is an amount in the range of from about 3 to about 4 weight parts water per 1 weight part of monomers and humate.

A preferred base neutralizer is a 50% aqueous solution of rayon grade sodium hydroxide, wherein a stoichiometric quantity of base is added dependent on the presence of any acid monomer in the reaction mass.

Oxygen, to inhibit homopolymerization, can be introduced into the reactor containing the base solution by bubbling air into the base solution at a rate of about 10 L/min.

Thereafter, the required quantity of any acid monomer, such as one defined in formula (3), can be slowly added to maintain a temperature below 75° F. The pH of the solution is measured to determine if the pH is in the desired range of neutral to slightly basic. Accordingly, the pH value is an amount in the range of from about 7 to about 8.5, preferably from about 7 to about 7.5, and still more preferably in the range of 7.2 to 7.3. If the pH value is less than an amount in the range of from about 7.2 to about 7.3, then base is added until the pH is increased to a value within the stated range. If the pH value is greater than an amount in the range of 7.2 to 7.3, then additional monomer is added until the pH decreases to a value within the stated range.

An effective quantity of humate, which is an amount in the range of from about 3 to about 25, preferably from about 5 to about 20 and still more preferably from about 8 to about 13 parts by total weight of monomer reactants per 1 part by weight humate, calculated as potassium humate, is then added, with stirring, to the reactor containing the neutralized solution and permitted to dissolve. It is believed that the humate ingredient operates to control the molecular weight of the polymer composition wherein an increase in the concentration of humate causes the molecular weight of the polymer composition to decrease and, conversely, a decrease in the concentration of humate causes the molecular weight of the composition to increase.

The required quantity of vinylamide morpholine derivative, such as acrylomorpholine (commonly known as ACMO), is then added to the solution of humate and neutralized chemical in the reactor with stirring and heating. The remaining deionized water is then added to the reactor to help insure that all of the chemicals are in solution.

At this time the introduction of any air into the reactor is terminated and nitrogen is then introduced into the reactor at a rate in the range of from about 2 to about 25 L/min to purge the reactor of oxygen.

Thereafter, the required quantity of styrene sulfonic acid salt, such as sodium styrene sulfonate, is added, with stirring, at a rate to maintain the solution at a temperature in the range of about 65 to about 75° F.

The temperature of the reactant solution is then adjusted to a value in the range of from about 100 to about 120, preferably from about 110 to about 114 and still more preferably to about 112° F. and maintained at that value for a period of about one hour.

When the vinylamide morpholine derivative is dissolved and the indicated desired temperature is obtained, then an effective quantity of a water soluble chain transfer agent, which is an amount in the range of from about 200 to about 500 total moles of monomer reactants per 1 mole of weight chain transfer agent, is added to the solution in the reactor and permitted to dissolve therein. The chain transfer agent is preferably added to the reaction mass in an aqueous solution having in the range of from about 3 to about 5 parts by weight transfer agent per 100 parts by weight aqueous solution. Examples of water soluble chain transfer agents useful herein include sodium allylsulfonate and tetraethylenepentamine wherein tetraethylenepentamine (commonly known as TEPA) is preferred. As indicated, the chain transfer agent is preferably added as a 3 to 5 percent aqueous solution. It is believed that the chain transfer agent operates to control the molecular weight of the polymerization product, wherein an increase in the concentration of chain transfer agent causes the molecular weight of the polymer composition to decrease and, conversely, a decrease in the concentration of chain transfer agent causes the molecular weight of the composition to increase.

An effective quantity of a water soluble polymerization initiator, which is believed to be an amount in the range of from about 70 to about 80 total moles of monomer reactants per 1 mole of initiator, is added to the reactor to cause reaction to commence. The initiator is preferably added to the reaction mass in an aqueous solution having in the range of from about 15 to about 25 parts by weight initiator per 100 parts by weight aqueous solution. A preferred initiator is a 20% aqueous solution of sodium persulfate (commonly referred to as SP). Initiators useful herein are disclosed in U.S. Pat. No. 4,726,906.

The reaction is exothermic in nature and is accompanied by a decrease in pH of the solution. Accordingly, the temperature and pH of the reaction mass are monitored. Stabilization of temperature and pH indicates completion of the reaction. Typically, the pH of the solution stabilizes at a value in the range of from about 6.5 to about 7.5 and the temperature stabilizes at a value in the range of from about 120 to about 140° F.

After about one hour, the resulting polymerization product of the process is allowed to cool to room temperature.

The total weight of the disclosed vinyl derivatives, in the combinations and mole ratios disclosed in the present application is an amount in the range of from about 10 to about 30, preferably 15 to 25 and still more preferably from about 18 to about 22 percent by total weight of solution.

For purposes of comparison, a random copolymer comprising the monomer reactants employed herein can be prepared in accordance with the procedures disclosed in copending applications Ser. No. 08/964,622, filed Nov. 5, 1997, and Ser. No. 09/092,294 filed Jun. 5, 1998.

According to the copending applications, the polymerization process comprises forming an aqueous solution of the vinyl morpholine derivative and a branched N-vinylamide derivative and causing the monomers to react under the influence of an effective amount of a suitable water soluble initiator at atmospheric pressure and at a temperature in the range of from about 104 to about 122 degrees Fahrenheit.

Addition of initiator to the reaction mass is conveniently effected in water solution. For example, in one preferred embodiment featuring acryloylmorpholine and 2-acrylamido-2-methylpropanesulfonic acid as the reactants, the initiator, sodium persulfate, is added to the reaction mass in a 14.5 percent by weight aqueous solution. As such, when the combined weights of the reactants, initiator and solution water are considered, sodium persulfate is present in an amount in the range of from about 0.05 to about 0.2, preferably from about 0.075 to about 0.15 and more preferably about 0.09 to about 0.12 percent by weight of the entire reaction mass.

The term "cement," as used herein, is intended to include those compounds of a cementitious nature which are described as hydraulic cements. Such compounds include, for example, Portland Cement in general and particularly Portland Cements of API Classes G and H, although other API classes can be utilized, as well as pozzolan cements, gypsum cements, high alumina content cements, slag cements, high gel (high clay content) cements, silicate containing cements, ultrafine cements and high alkalinity cements. Portland cements and, particularly, cement of API Classes G and H are preferred.

The aqueous fluid utilized in the cement composition can be water from any source provided that it does not contain an excess of any compounds that affect the stability of the cement composition of the present invention. The aqueous fluid can contain various salts such as sodium chloride, potassium chloride, calcium chloride and the like.

Other types of well known and conventional additives also can be incorporated into the cement composition to modify the properties of the composition. Such additives include additional fluid loss additives, viscosifiers, retarders, accelerators, dispersants, weight-adjusting materials or fillers and the like.

Additional fluid loss additives which may be incorporated into the cement composition of the present invention include cellulose derivatives such as carboxymethylhydroxyethyl cellulose, hydroxyethyl cellulose, modified polysaccharides, polyacrylamides, polyaromatic sulfonates, guar gum derivatives, mixtures of such compounds and the like. Numerous other compounds which may be utilized as additional fluid loss additives are well known by those skilled in cementing technology.

A retarder may be used in the cementing composition when the bottom hole circulating temperature exceeds 100 degrees F. Examples of retarders which can be used herein include lignosulfonates, such as calcium lignosulfonate and sodium lignosulfonate, organic acids, such as citric acid, tartaric acid and gluconic acid and mixtures thereof. The amount of retarder required will vary according to the bottom hole circulating temperatures and variation in the makeup of the cement itself.

The proper amount of retarder required in any particular case should be determined by running a "thickening time" test for the particular concentration of retarder and cement composition being used. Such tests should be run according to the procedures set forth in API SPEC 10 using a device called a consistometer. Generally speaking, "thickening time" is defined in API SPEC 10 as the elapsed time starting when pumping begins and ending when the cement attains a value in the range of from about 70 to 100 units of consistency, referred to as Bearden units of consistency. Bearden units of consistency obtained on a pressurized consistometer are referred to as Bc units. Bearden units of consistency obtained on an atmospheric pressure consistometer are referred to as ABc units. In most applications the amount of retarder, if any required, will not exceed more than about 5.0 percent by weight of the dry cement.

Dispersing agents can be utilized to facilitate using lower quantities of water and to promote higher set cement strength. Friction reducers, which promote freer movement of the unset composition, and allow ease of pumping through the annulus, if present, can be incorporated in the slurry in amounts up to about several percent by weight of dry cement. Some dual function additives, such as lignosulfonates, which function both as a dispersant and also as a set time retarder, can be incorporated in the slurry where their use would be advantageous for certain cementing situations.

Accelerators, such as the soluble inorganic salts in addition to calcium chloride, can be utilized in amounts up to about 8 percent by weight of dry cement.

The cement composition also may include, in particular applications, foaming agents or defoaming agents which comprise various anionic, cationic, nonionic and other surface active compounds. The amount of such surface active agents added to the cement composition will typically be in the range of from about 0.1 to about 3 percent by weight of dry cement. Generally, the selection of such additives will be within the skill of those knowledgeable in the art of well cementing.

Of the various types of fine aggregate which can be used, fly ash, silica flour, fine sand, diatomaceous earth, lightweight aggregate and hollow spheres can be cited as typical. The use of these materials is well understood in the art, and so long as they are compatible with the compositions of the invention, they can be employed over wide ranges of concentrations.

EXAMPLES

The following examples are provided, not by way of limitation, but to illustrate some benefits of the composition and method of the present invention.

Example 1

For purposes of comparison, a polymer composition, employing the ingredients in the quantities set out in Table 1, below, was prepared in accordance with the procedure disclosed in application Ser. No. 08/964,622 filed Nov. 5, 1997. The reaction was conducted at atmospheric pressure and at the initial reaction temperature of 111 degrees Fahrenheit. The procedure employed to make the polymer composition is as follows.

About 70% of the indicated quantity of D.I. Water is placed in a reaction vessel of suitable size which is equipped with a recirculating pump and associated tubing, a mechanical stirrer, a nitrogen sparge tube, an addition funnel, a temperature indicating means and a means for heating the vessel and the contents thereof. The mixer is activated to stir at 130 rpm and the indicated quantities of monomers are slowly added in sequence with continuous mixing until all monomers are completely dissolved. After all monomers are added, the balance of water is added with continuous mixing. The solution is then sparged with nitrogen at 22 liters per minute for a total of 30 minutes to exclude air (oxygen) from the reaction.

Thereafter, the nitrogen sparge rate is changed to 10 liters per minute, the stirring rate is changed to 110 rpm, the entire indicated quantity of an initiator in water solution is rapidly added and the temperature of the reaction mass is monitored until it appears to stabilize, which is an indication of the completion of the reaction.

Thereafter, the reaction mass is recirculated until the temperature of the mass fully stabilizes. Then, recirculating, mixing and sparging are terminated, the temperature of the mass is adjusted to a value of about 140 degrees Fahrenheit and the mass is maintained at that temperature in the closed reaction vessel for at least about 3 hours until the viscosity of the reaction product attains a value in the range of from about 5000 to about 11,000 centipoises.

TABLE 1

PREPARATION OF POLYMER COMPOSITION ACCORDING TO
THE PROCEDURE DISCLOSED IN
APPLICATION SERIAL NUMBER 08/964,622 FILED
NOVEMBER 5, 1997

| POLYMER A | |
| --- | --- |
| | grams |
| ACMO (monomer) | 1406.129 |
| AMPS (monomer) | 4581.259 |
| DI WATER | 52162.85 |
| Sub Totals | 58150.238 |
| SP (initiator) | 59.00 |
| DI WATER | 344.7 |
| Sub Totals | 403.7 |
| Total | 58553.938 |
| MOLE RATIOS | |
| ACMO/AMPS | 1/2.219 |
| MONOMERS/SP | 129.49 |
| WEIGHT PERCENTS | |
| SP (solution) | 14.615 |
| SP (overall) | 0.101 |
| ACTIVE | 10.326 |

Note: 1. ACMO is acryloylmorpholine.
2. AMPS is 2-acrylamido-2-methylpropane sulfonic acid.
3. SP is sodium persulfate. The indicated mole ratio of SP is the sum of the molar quantities of the monomer reactants divided by the number of moles of SP. The indicated weight percent of SP (solution) is the concentration of SP in the solution added to the reaction. The indicated weight percent of SP (overall) is the concentration of SP in the entire reaction mass.
4. D.I. WATER is deionized water.
5. The reaction mass at this point is a liquid and has an acid pH.
6. The method of preparation of the additive, as shown in this Example 1, produces a random arrangement of polymers.
7. The weight percent ACTIVE is the total weight of monomers and initiator as a percent of the total weight of the reaction mass.

Example 2

Polymer A, produced as described in Example 1, above, was further treated by converting it from the liquid acid form to the dry salt form by base neutralization. Accordingly, Polymer A, a viscous acidic liquid, was contacted with a 30 weight percent aqueous solution of calcium hydroxide, an example of which is commercially available as Mississippi Lime. The pH of the solution was adjusted to a value in the range of from about 7 to 8. Thereafter, a small quantity of a silicon solution release agent was added to the neutralized solution which was then placed in a drum dryer rotating at 4 revolutions per minute and operating at about 300 degrees Fahrenheit. The material was maintained in the dryer under the mentioned conditions for a time sufficient to produce a dried product which was then reduced to a fine powder by milling. The milled product was then used as described in Example 3, below.

Example 3

Cement slurries were prepared and tested for fluid loss, consistency and rheological properties in accordance with the provisions of API SPEC 10. Polymer A, shown in Table 1, above, after first being neutralized, dried and milled in accordance with Example 2, was employed in the slurries referred to in Table 2, below. The quantities of "Polymer"

and mix water referred to in Table 2 are expressed as percent by weight of dry API CLASS H cement unless otherwise noted.

The mix water employed, unless otherwise noted, was potable city tap water as available in Mesquite, Texas. In some runs the mix water included other ingredients which are referred to as "Additive." The quantity of "Additive" is expressed as percent by weight of mix water.

With respect to data included in Table 2, unless otherwise noted: Fluid Loss was determined in accordance with the provisions of API Spec 10, Appendix F. Consistency was determined in accordance with the provisions of API Spec 10, Section 9. Rheological properties were determined in accordance with the provisions of API Spec 10, Appendix H using a Fann Rotational Viscometer OFI Model 800 with rotor sleeve R1, bob B1 and loaded with a 1 inch spring.

TABLE 2

POLYMER A, FROM EXAMPLES 1 and 2 and TABLE 1
38 PERCENT MIX WATER

|  | Run # | | | | |
|---|---|---|---|---|---|
|  | $1^3$ | 2 | 3 | 4 | $5^2$ |
| Polymer, wt % | 0.0 | 0.3 | 0.5 | 0.6 | 0.8 |
| Additive, wt % | 0.0 | 0.0 | 0.0 | $2.0^1$ | 0.0 |
| Temp deg F. | 125 | 125 | 125 | 125 | 180 |
| Fluid Loss cc/30 mm | 1200 | 90 | 44 | 66 | 44 |
| Consistency |  |  |  |  |  |
| initial, ABc | 10 | 8 | 10 | 10 | 13 |
| @ 20 min, ABc | 17 | 9 | 11 | 9 | 7 |
| Rheology |  |  |  |  |  |
| 600 rpm | 220 | 210 | 330+ | 330+ | 209 |
| 300 rpm | 181 | 124 | 224 | 161 | 122 |
| 200 rpm | 159 | 90 | 165 | 118 | 89 |
| 100 rpm | 130 | 53 | 98 | 70 | 51 |
| 6 rpm | 21 | 7 | 12 | 10 | 5 |
| 3 rpm | 14 | 6 | 8 | 7 | 3 |

Footnotes Table 2:
[1]Calcium chloride.
[2]Mix water was simulated sea water, an aqueous alkaline solution consisting of 3.4% FRITZ SUPER SALT by weight of solution. FRITZ SUPER SALT is a concentrate available from Fritz Industries, Inc., of Mesquite, Texas. De chlorinated water was employed to dilute the concentrate to prepare the mix water employed in run #5.
[3]Run #1 did not contain any polymer and is provided as a basis for comparison.

Example 4

Cement slurries were prepared and tested for thickening time, zero gel time, transition time and compressive strength. Polymer A, shown in Table 1, above, after first being neutralized, dried and milled in accordance with Example 2, was employed in the slurries referred to in Table 3.

The quantities of "Polymer," mix water and retarder, referred to in Table 3 are expressed as percent by weight of dry API CLASS H cement unless otherwise noted. The retarder employed, unless otherwise noted, was sodium lignosulfonate.

The mix water employed, unless otherwise noted, was potable city tap water as available in Houston, Tex.

Unless otherwise noted, Thickening Time was determined in accordance with the provisions of API Spec 10. Zero Gel Time and Transition Time were determined in accordance with Sabins et al, mentioned previously, and compressive strength was measured with an Ultrasonic Cement Analyzer (UCA).

TABLE 3

POLYMER A, FROM EXAMPLES 1 and 2 and TABLE 1
MIX WATER[1]

|  | Run # | | | | | |
|---|---|---|---|---|---|---|
|  | $6^3$ | 7 | $8^3$ | 9 | $10^3$ | 11 |
| Polymer, % | 0.0 | 0.6 | 0.0 | 0.6 | 0.0 | 1.4 |
| Retarder, % | 0.15 | 0.15 | 0.375 | 0.375 | $0.4^2$ | $0.4^2$ |
| Temp deg F. | 140 | 140 | 200 | 200 | 250 | 250 |
| Thickening Time, HRS:MIN |  | 4:45 |  | 4:20 |  | 4:19 |
| Zero Gel Time, HRS:MIN | 0:53 | 9:05 | 0:47 | 7:13 | 1:07 | 4:01 |
| Transition Time, HRS:MIN | 3:33 | 0:05 | 0:14 | 1:05 | 1:02 | 1:07 |
| Comp Strength HRS:MIN |  |  |  |  |  |  |
| 50 psi | 8:10 | 9:39 | 7:46 | 10:26 | 5:45 | 6:47 |
| 500 psi | 9:35 | 10:51 | 8:27 | 11:18 | 6:31 | 7:44 |
| 24 hours PSI | 2591 | 2786 | 3175 | 2660 | 2090 | 1439 |

Footnotes Table 3:
1. Runs 6, 7, 8 and 9 were made using 40 percent mix water and runs 10 and 11 were made using 55 percent mix water.
2. 0.2% sodium lignosulfonate and 0.2% tartaric acid.
3. Runs 6, 8 and 10 did not contain any polymer and are provided for purposes of comparison.

Examples 1, 2, 3 and 4 and Tables 1, 2 and 3, above, contain information, disclosure and data which are included in co-pending application Ser. No. 08/964,622 filed Nov. 5, 1997.

Examples 5, 6, 7, and 8 and Tables 4, 5, 6 and 7, below, contain information, disclosure and data which are included in co-pending application Ser. No. 09/092,294 filed Jun. 5, 1998.

Example 5

Polymer compositions (Polymers 1, 2 and 3), employing the ingredients in the quantities set out in Table 4, below, were prepared as follows.

The polymerization reactions were conducted in suitably sized glass and stainless steel reactors each equipped with an overhead stirrer assembly, a temperature probe connected to a recording thermometer, ports for the addition of liquids and solids, a pH probe connected to a pH meter, a gas inlet tube, and a heating/cooling coil. Additionally, the stainless steel reactor was equipped with a circulation system. Polymer 1 was made in the glass reactor. Polymers 2 and 3 were made in the stainless steel reactor.

The reactor was first charged with 75% of the required de-ionized water. The required quantity of rayon grade, sodium hydroxide (supplied as a 50% solution in water) was added. The mixture was stirred and the resulting base solution was cooled to 65° F. (With regard to polymers 2 and 3, the base solution was also circulated and air was bubbled into the solution at a rate of 10 L/min.)

The required quantity of 2-acrylamido-2-methylpropanesulfonic acid (commonly known as AMPS) was measured, and then added at a rate to maintain the solution at a temperature in the range of 65 to 75 degrees F. The pH of the solution was measured. If the pH of the solution was below a pH value in the range of 7.2 to 7.3, then the sodium hydroxide solution was added until the pH value was increased to 7.2 to 7.3. If the pH of the solution was greater than 7.2 to 7.3, then additional AMPS was added until the pH decreased to a value in the range of 7.2 to 7.3.

In the case of polymer 3, the required amount of acrylamide (AA) was measured and then added to the reactor.

The required quantity of potassium humate was measured, and then added to the reactor. Any potassium humate remaining in the measuring container was washed with the reserved de-ionized water, and then added to the reactor.

The required quantity of acrylomorpholine (commonly known as ACMO) was measured, and then added to the reactor. The remaining deionized water was used to rinse the ACMO measuring container, and the sides of the reactor to insure the inclusion of all of the ingredients in solution.

Introduction of air into the reactor for making polymers 2 and 3 was stopped. Nitrogen was then introduced into the reactor. (For polymer 1, the nitrogen rate was about 2 to 3 L/min, and for polymers 2 and 3 the nitrogen rate was about 20 to 25 L/min.) The solution was heated to 112° F. for a one hour.

The required quantity of a solution of tetraethylenepentamine (commonly known as TEPA) was added to the reactor. In the case of polymers 1 and 2, a 3.0% solution was employed. A 5.0% solution was employed in making polymer 3.

The required quantity of a 20% solution of sodium persulfate (commonly referred to as SP) was added to the reactor. The pH and temperature of the polymerization were monitored. The pH of the solution decreased to about 7.2 and the temperature increased to about 125 degrees F.

After about one hour, the resulting polymerization product was allowed to cool to room temperature.

Example 6

A small quantity of silicon solution, as a release agent, was added to polymers 2 and 3. These polymers were then placed in a drum dryer rotating at 4 revolutions per minute and held at a temperature of about 300 degrees F. The polymers were maintained in the dryer at the mentioned conditions for a time sufficient to produce a dried product which was then reduced to a fine powder by milling. The milled products were then employed in the Examples 7 and 8 below.

TABLE 4

RECIPE FOR MAKING POLYMER PRODUCT OF INVENTION

| Ingredient | POLYMER 1 Grams | POLYMER 2 Pounds | POLYMER 3 Pounds |
|---|---|---|---|
| ACMO (monomer) | 17.11 | 1.7 | 3.60 |
| AMPS (monomer) | 120.56 | 26.2 | 22.60 |
| AA (monomer) | 0.0 | 0.0 | 4.85 |
| NaOH | 23.27 | 5.0 | 8.75 |
| Potassium humate | 13.38 | 2.8 | 2.80 |
| DI WATER | 598.66 | 122.2 | 117.40 |
| Sub Total | 772.98 | 157.9 | 160.00 |
| SP (initiator) | 2.12 | 0.46 | 0.51 |
| DI WATER | 8.49 | 1.84 | 2.05 |
| Sub Total | 10.61 | 2.3 | 2.56 |
| TEPA (chain transfer) | 0.32 | 0.07 | 0.13 |
| DI Water | 10.29 | 2.23 | 2.44 |
| Sub Total | 10.61 | 2.3 | 2.57 |
| Totals | 794.2 | 162.5 | 165.13 |
| MOLE RATIOS | | | |
| ACMO/NaAMPS/AA | 1/4.8/0.0 | 1/10.5/0.0 | 1/6.4/0.7 |
| NaOH/AMPS | 1/1 | 1/1 | 1/1 |
| MONOMERS/SP | 78.9/1 | 71.6/1 | 79.4/1 |
| MONOMERS/TEPA | 418.4/1 | 374.2/1 | 220.1/1 |
| WEIGHT PERCENTS | | | |
| Potassium humate | 1.68 | 1.72 | 1.74 |
| SP (solution) | 20.0 | 20.0 | 20.0 |
| SP (overall) | 0.27 | 0.28 | 0.32 |
| TEPA (solution) | 3.0 | 3.0 | 5.0 |
| TEPA (overall) | 0.04 | 0.04 | 0.08 |
| ACTIVE | 20.94 | 20.93 | 20.07 |

Note
1. ACMO is acryloylmorpholine.
2. AMPS is 2-acrylamido-2-methylpropane sulfonic acid. Prior to polymerization, the sodium salt of AMPS (NaAMPS) is prepared by adding NaOH to the reactor.
3. AA is acrylamide. The quantity stated is 100% active, however, it is employed as a 52% aqueous solution.
4. NaOH is sodium hydroxide. The quantity stated is 100% active, however it is employed as a 50% aqueous solution to neutralize the AMPS to form NaAMPS.
5. Humate is a generalization for any naturally occurring humic acid derivative. The indicated weight percent of potassium humate is the percent by weight of humate in the entire reaction mass. It is believed that humate functions to control molecular weight of the polymer product.
6. SP is sodium persulfate, a polymerization initiator. The indicated mole ratio of SP is the sum of the molar quantities of the monomer reactants divided by the number of moles of SP. The indicated weight percent of SP (solution) is the concentration of SP in the solution added to the reaction. The indicated weight percent of SP (overall) is the concentration of SP in the entire reaction mass.
7. TEPA is tetraethylenepentamine, a chain transfer agent employed to control molecular weight of the polymer product. The indicated mole ratio of TEPA is the sum of the molar quantities of the monomer reactants divided by the number of moles of TEPA. The indicated weight percent of TEPA (solution) is the concentration of TEPA in the solution added to the reaction. The indicated weight percent of TEPA(overall) is the concentration of TEPA in the entire reaction mass.
8. D.I. WATER is deionized water.
9. The reaction mass at this point is a liquid having a substantially neutral pH.
10. The method of preparation of the polymer product, as shown in this Example 5, produces a random arrangement of copolymers.
11. The weight percent ACTIVE is the total weight of ACMO, NaAMPS, AA, TEPA, humate and SP as a percent of the total weight of the entire reaction mass.

Example 7

Cement slurries were prepared and tested for fluid loss, consistency and Theological properties in accordance with the provisions of API SPEC 10. Polymers 2 and 3, shown in Table 4, above, were employed in the slurries referred to in Tables 5 and 6, respectively, below. The quantities of "Polymer" and mix water referred to in Tables 5 and 6 are expressed as percent by weight of dry API CLASS H cement unless otherwise noted.

The mix water employed, unless otherwise noted, was potable city tap water as available in Mesquite, Tex. In some runs the mix water included other ingredients which are referred to as "Additive." The quantity of "Additive" is expressed as percent by weight of mix water.

With respect to data included in Tables 5 and 6, unless otherwise noted: Fluid Loss was determined in accordance with the provisions of API Spec 10, Appendix F. Consistency was determined in accordance with the provisions of API Spec 10, Section 9. Rheological properties were determined in accordance with the provisions of API Spec 10, Appendix H using a Fann Rotational Viscometer OFI Model 800 with rotor sleeve R1, bob B1 and loaded with a 1 inch spring.

TABLE 5

POLYMER 2, FROM EXAMPLE 6 and TABLE 4
38 PERCENT MIX WATER

| | Run # | | | | | | |
|---|---|---|---|---|---|---|---|
| | 1[1] | 12 | 13 | 14 | 15 | 16 | 17[6] |
| Polymer, wt % | 0.0 | 0.5 | 0.8 | 1.0 | 0.8 | 1.0 | 0.8 |
| $CaCl_2$[2], wt % | 0.0 | 0.0 | 0.0 | 0.0 | 0.0 | 0.0 | 0.0 |
| Temp deg F. | 125 | 125 | 125 | 125 | 125 | 125 | 180 |
| Fluid Loss cc/30 min | 1200 | 78 | 38 | 28 | 132 | 54 | 99 |
| Consistency | | | | | | | |
| initial, ABc | 10 | | | | | | |
| @ 20 min, ABc | 17 | | | | | | |
| Rheology | | | | | | | |
| 600 rpm | 220 | 185 | 227 | 300+ | 267 | 270 | 231 |
| 300 rpm | 181 | 104 | 165 | 213 | 161 | 159 | 136 |
| 200 rpm | 159 | 74 | 119 | 153 | 116 | 115 | 98 |
| 100 rpm | 130 | 42 | 67 | 85 | 67 | 66 | 55 |
| 6 rpm | 21 | 5 | 6 | 7 | 8 | 7 | 5 |
| 3 rpm | 14 | 4 | 4 | 5 | 6 | 5 | 4 |

| | Run # | | | | | | | | |
|---|---|---|---|---|---|---|---|---|---|
| | 18 | 19 | 20 | 21 | 22 | 23 | 24 | 25 | 26 |
| Polymer, wt % | 1.0 | 1.0 | 1.0 | 1.0 | 1.0 | 1.0 | 1.0 | 1.0 | 1.0 |
| NaCl[2] | 0.0 | 18.0 | 36.0 | 0.0 | 18.0 | 36.0 | 0.0 | 18.0 | 36.0 |
| Silica flour | 0.0 | 0.0 | 0.0 | 0.0 | 0.0 | 0.0 | 35.0 | 35.0 | 35.0 |
| Retarder[3] | 0.0 | 0.0 | 0.0 | 0.2 | 0.2 | 0.2 | 0.5 | 0.5 | 0.5 |
| Temp deg F. | 180 | 180 | 180 | 180 | 180 | 180 | 180 | 180 | 180 |
| Fluid Loss cc/30 min | 52 | 171 | 169 | 28 | 74 | 32 | 22 | 32 | 24 |
| Consistency | | | | | | | | | |
| initial, ABc | 14 | 16 | 14 | 14 | 7 | 14 | 23 | 21 | |
| @ 20 min, ABc | 11 | 10 | 8 | 10 | 6 | 9 | 15 | 10 | |
| Rheology | | | | | | | | | |
| 600 rpm | 330+ | 330+ | 322 | 330+ | 257 | 235 | 330+ | 330+ | |
| 300 rpm | 231 | 204 | 187 | 191 | 151 | 136 | 291 | 230 | |
| 200 rpm | 176 | 152 | 134 | 134 | 109 | 96 | 202 | 164 | |
| 100 rpm | 105 | 94 | 75 | 72 | 61 | 53 | 108 | 88 | |
| 6 rpm | 19 | 22 | 10 | 6 | 6 | 5 | 8 | 7 | |
| 3 rpm | 16 | 20 | 8 | 5 | 4 | 4 | 6 | 5 | |

| | Run # | | | | | | | |
|---|---|---|---|---|---|---|---|---|
| | 27 | 28 | 29 | 30 | 31 | 32 | 33 | 34 |
| Polymer, wt % | 1.0 | 1.0 | 1.0 | 1.0 | 1.0 | 1.0 | 1.0 | 1.5 |
| NaCl[2] | 0.0 | 18.0 | 36.0 | 0.0 | 18.0 | 36.0 | 36.0 | 36.0 |
| Silica flour | 35.0 | 35.0 | 35.0 | 35.0 | 35.0 | 35.0 | 35.0 | 35.0 |
| Retarder[3] | 0.5 | 0.5 | 0.5 | 1.0 | 1.0 | 1.0 | 1.0 | 1.0 |
| Temp deg F. | 245 | 245 | 245 | 308 | 308 | 308 | 308 | 308 |
| Fluid Loss cc/30 min | 20 | 25 | 27 | 52 | 36 | 42 | 36 | 20 |
| Consistency | | | | | | | | |
| initial, ABc | 23 | | | | | | 15 | 14 |
| @ 20 min, ABc | 15 | | | | | | 12 | 10 |
| Rheology | | | | | | | | |
| 600 rpm | 330+ | | | | | | 330+ | 330+ |
| 300 rpm | 291 | | | | | | 330+ | 330+ |
| 200 rpm | 202 | | | | | | 224 | 228 |
| 100 rpm | 108 | | | | | | 134 | 139 |
| 6 rpm | 8 | | | | | | 9 | 10 |
| 3 rpm | 6 | | | | | | 6 | 7 |

Footnotes Table 5:
1. Run #1 did not contain any polymer and is provided for purposes of comparison.
2. Percent by weight of mix water.
3. Calcium lignosulfonate.
4. Runs 33 and 34 contain 41.7% mix water.
5. Measured at 180 degrees F.
6. See footnote 2, Table 2

TABLE 6

POLYMER 3, FROM EXAMPLE 6 and TABLE 4
38 PERCENT MIX WATER

| | Run # | | | | | | | | |
|---|---|---|---|---|---|---|---|---|---|
| | 35 | 36 | 37 | 38 | 39 | 40 | 41 | 42 | 43 |
| Polymer, wt % | 0.3 | 0.5 | 0.8 | 0.3 | 0.5 | 0.8 | 0.3 | 0.5 | 0.8 |
| $NaCl_2$ | 0.0 | 0.0 | 0.0 | 18.0 | 18.0 | 18.0 | 36.0 | 36.0 | 36.0 |
| Silica flour | 35.0 | 35.0 | 35.0 | 35.0 | 35.0 | 35.0 | 35.0 | 35.0 | 35.0 |
| Retarder[3] | 0.5 | 0.5 | 0.5 | 0.5 | 0.5 | 0.5 | 0.5 | 0.5 | 0.5 |
| Temp deg F. | 180 | 180 | 180 | 180 | 180 | 180 | 180 | 180 | 180 |
| Fluid Loss cc/30 min | 64 | 38 | 22 | 92 | 38 | 29 | 80 | 42 | 23 |
| Consistency | | | | | | | | | |
| initial, ABc | 11 | 11 | 20 | 10 | 14 | 20 | 10 | 12 | 20 |
| @ 20 min, ABc[4] | 9 | 10 | 14 | 9 | 10 | 12 | 9 | 9 | 11 |
| Rheology | | | | | | | | | |
| 600 rpm | 212 | 276 | 330+ | 206 | 255 | 330+ | 235 | 260 | 330+ |
| 300 rpm | 112 | 160 | 315 | 105 | 131 | 217 | 115 | 127 | 196 |
| 200 rpm | 78 | 113 | 220 | 71 | 90 | 154 | 76 | 90 | 139 |
| 100 rpm | 40 | 60 | 121 | 37 | 47 | 83 | 41 | 48 | 76 |
| 6 rpm | 5 | 5 | 10 | 4 | 4 | 7 | 4 | 5 | 6 |
| 3 rpm | 4 | 4 | 5 | 3 | 3 | 4 | 3 | 4 | 4 |

| | Run # | | | | |
|---|---|---|---|---|---|
| | 44 | 45 | 46 | 47 | 48 |
| Polymer, wt % | 1.5 | 1.5 | 1.5 | 1.0 | 1.5 |
| $NaCl_2$ | 18.0 | 00.0 | 18.0 | 36.0 | 36.0 |
| Silica flour | 35.0 | 35.0 | 35.0 | 35.0 | 35.0 |
| Retarder[3] | 0.5 | 1.5 | 1.5 | 1.0 | 1.0 |
| Water % | 38.0 | 47.9 | 41.7 | 41.7 | 41.7 |
| Temp deg F. | 245 | 308 | 308 | 308 | 308 |
| Fluid Loss cc/30 min | 18 | 22 | 30 | 26 | 22 |
| Consistency | | | | | |
| initial, ABc[4] | 21 | 19 | 25 | 15 | 15 |
| @ 20 min, ABc[4] | 10 | 10 | 12 | 11 | 12 |
| Rheology[4] | | | | | |
| 600 rpm | 330+ | 330+ | 330+ | 330+ | 330+ |
| 300 rpm | 205 | 173 | 208 | 330+ | 330+ |
| 200 rpm | 146 | 121 | 146 | 226 | 231 |
| 100 rpm | 83 | 65 | 85 | 137 | 140 |
| 6 rpm | 7 | 6 | 7 | 8 | 12 |
| 3 rpm | 5 | 3 | 4 | 5 | 7 |

Footnotes Table 6:
2. Percent by weight of mix water.
3. Calcium lignosulfonate.
4. Measured at 180° F.

Example 8

Cement slurries were prepared and tested for thickening time, zero gel time, transition time and compressive strength. Polymers 2 and 3, shown in Table 4, above, were employed in the slurries referred to in Table 7, below.

The quantities of "Polymer," mix water, accelerator and retarder, referred to in Table 7 are expressed as percent by weight of dry API CLASS H cement unless otherwise noted. The retarder employed, unless otherwise noted, was sodium lignosulfonate. The accelerator employed, unless otherwise noted, was calcium chloride.

The mix water employed, unless otherwise noted, was potable city tap water as available in Houston, Tex.

Unless otherwise noted, Thickening Time was determined in accordance with the provisions of API Spec 10. Zero Gel Time and Transition Time were determined in accordance with Sabins et al, mentioned previously, and compressive strength was measured with an Ultrasonic Cement Analyzer (UCA).

TABLE 7

POLYMERS 2 AND 3, FROM EXAMPLE 6 and TABLE 4
MIX WATER[1]

| | Run # | | | |
|---|---|---|---|---|
| | 48 | 49 | 50 | 51 |
| Polymer 2, % | 0.0 | 0.6 | 0.6 | 1.4 |
| Polymer 3, % | 0.6 | 0.0 | 0.0 | 0.0 |
| Retarder, % | 0.0 | 0.15 | 0.375 | 0.42 |
| Accelerator, % | 1.0 | 0.0 | 0.0 | 0.0 |
| Temp deg F. | 80 | 140 | 200 | 250 |
| Thickening Time, HRS:MIN | 4:05 | 3:45 | 3:45 | 3:39 |

TABLE 7-continued

POLYMERS 2 AND 3, FROM EXAMPLE 6 and TABLE 4 MIX WATER[1]

| | Run # | | | |
|---|---|---|---|---|
| | 48 | 49 | 50 | 51 |
| Zero Gel Time, HRS:MIN | 4:05 | 6:12 | 2:24 | 2:32 |
| Transition Time, HRS:MIN | 0:30 | 0:22 | 0:32 | 0:27 |
| Comp Strength HRS:MIN | | | | |
| 50 psi | 3:54 | 4:28 | 3:25 | 3:47 |
| 500 psi | 7:50 | 5:50 | 3:59 | 4:35 |
| 24 hours psi | — | 2669 | 3456 | 1878 |
| 48 hours psi | 3641 | — | — | — |

Footnotes Table 7:
1. Runs 48, 49 and 50 were made using 40 percent mix water and run 51 was made using 55 percent mix water.
2. 0.2% sodium lignosulfonate and 0.2% tartartic acid.

The polymer composition prepared by the method of the prior copending application filed Nov. 5, 1997, is not the same as the polymer composition prepared by the method of the prior copending application filed Jun. 5, 1998. This difference can be illustrated by comparing the fluid loss results shown in Table 2, run 4, which employs Polymer A from the application filed Nov. 5, 1997, with the fluid results shown in Table 5, runs 15 and 16, which employs Polymer 2 from the application filed Jun. 5, 1998. All of these runs were conducted at 125° F. and employed the same quantity of fresh water and the same quantity of calcium chloride. However, the quantity of Polymer 2 required to obtain an acceptable fluid loss is greater than the quantity of Polymer A. The difference in the compositions can also be illustrated by comparing the fluid loss results of runs 5 and 17 and runs 2 and 12.

Example 9

Method of Making the Polymer Product of the Invention

The polymer composition of this invention, hereinafter called Polymer B, employing the ingredients in the quantities set out in Table 8, below, was prepared as follows.

The polymerization reaction was conducted in suitably sized glass reactor equipped with an overhead stirrer assembly, a temperature probe connected to a recording thermometer, ports for the addition of liquids and solids, a pH probe connected to a pH meter, a gas inlet tube, and a heating/cooling coil.

The reactor was first charged with 75% of the required de-ionized water. The required quantity of rayon grade, sodium hydroxide (supplied as a 50% solution in water) was added. The mixture was stirred and the resulting base solution was cooled to 65° F.

The required quantity of 2-acrylamido-2-methylpropanesulfonic acid (commonly known as AMPS) was measured, and then added at a rate to maintain the solution at a temperature in the range of 65 to 75 degrees F. The pH of the solution was measured. If the pH of the solution was below a value of 7.5, then the sodium hydroxide solution was added until the pH value was increased to a value of 7.5. If the pH of the solution was greater than 7.5, then additional AMPS was added until the pH decreased to a value of 7.5.

The required amounts of acrylamide (AA), (supplied as a 52% solution in water) and sodium styrene sulfonate (SSS) were measured and then added to the reactor.

The required quantity of potassium humate was measured, and then added to the reactor. Any potassium humate remaining in the measuring container was washed with the reserved de-ionized water, and then added to the reactor.

The required quantity of acrylomorpholine (commonly known as ACMO) was measured, and then added to the reactor. The remaining de-ionized water was used to rinse the ACMO measuring container, and the sides of the reactor to insure the inclusion of all of the ingredients in solution.

Nitrogen was then introduced into the reactor at about 2 to 3 L/min, and the solution was heated to 112° F. for a one hour.

The required quantity of a 5.0% aqueous solution of tetraethylenepentamine (commonly known as TEPA) was added to the reactor.

The required quantity of a 20% aqueous solution of sodium persulfate (commonly referred to as SP) was added to the reactor.

The pH and temperature of the polymerization were monitored. The pH of the solution decreased to about 7.0 and the temperature increased to about 130° F.

After about one hour, the resulting polymerization product was allowed to cool to room temperature.

The polymer was then dried on a hot plate for a time sufficient to produce a dried product which was then reduced to a fine powder by milling. The milled product was then employed in Examples 10 and 11 below.

TABLE 8

RECIPE FOR MAKING POLYMER B

| Ingredient | Grams |
|---|---|
| ACMO (monomer) | 17.11 |
| AMPS (monomer) | 105.51 |
| AA (monomer) | 12.06 |
| SSS (monomer) | 3.31 |
| NaOH | 20.37 |
| Potassium humate | 13.38 |
| WATER | |
| with NaOH | 20.37 |
| With AA | 11.13 |
| DI water | 560.92 |
| Sub Total | 764.16 |
| SP (initiator) | 2.46 |
| DI WATER | 9.83 |
| Sub Total | 12.29 |
| TEPA (chain transfer) | 0.61 |
| DI Water | 11.68 |
| Sub Total | 12.29 |
| Totals | 788.74 |
| MOLE RATIOS | |
| ACMO/NaAMPS/AA/SSS | 1/4.2/1.4/0.13 |
| NaOH/AMPS | 1/1 |
| MONOMERS/SP | 79.1/1 |
| MONOMERS/TEPA | 245.4/1 |

TABLE 8-continued

RECIPE FOR MAKING POLYMER B

| Ingredient | Grams |
|---|---|
| WEIGHT PERCENTS | |
| Potassium humate | 1.70 |
| SP (solution) | 20.0 |
| SP (overall) | 0.31 |
| TEPA (solution) | 5.0 |
| TEPA (overall) | 0.08 |
| ACTIVE | 21.0 |

Notes for Table 8:
1. ACMO is acryloylmorpholine.
2. AMPS is 2-acrylamido-2-methylpropane sulfonic acid. Prior to polymerization, the sodium salt of AMPS (NaAMPS) is prepared by adding NaOH to the reactor.
3. AA is acrylamide. The quantity stated is 100% active, however, it is employed as a 52% aqueous solution.
4. SSS is sodium styrene sulfonate.
5. NaOH is sodium hydroxide. The quantity stated is 100% active, however, it is employed as a 50% aqueous solution to neutralize the AMPS to form NaAMPS.
6. Humate is a generalization for any naturally occurring humic acid derivative. The indicated weight percent of potassium humate is the percent by weight of humate in the entire reaction mass. It is believed that humate functions to control molecular weight of the polymer product.
7. SP is sodium persulfate, a polymerization initiator. The indicated mole ratio of SP is the sum of the molar quantities of the monomer reactants divided by the number of moles of SP. The indicated weight percent of SP (solution) is the concentration of SP in the solution added to the reaction. The indicated weight percent of SP (overall) is the concentration of SP in the entire reaction mass.
8. TEPA is tetraethylenepentamine, a chain transfer agent employed to control molecular weight of the polymer product. The indicated mole ratio of TEPA is the sum of the molar quantities of the monomer reactants divided by the number of moles of TEPA. The indicated weight percent of TEPA (solution) is the concentration of TEPA in the solution added to the reaction. The indicated weight percent of TEPA (overall) is the concentration of TEPA in the entire reaction mass.
9. D.I. WATER is deionized water.

TABLE 8-continued

RECIPE FOR MAKING POLYMER B

| Ingredient | Grams |
|---|---|
| 10. The reaction mass at this point is a liquid having a substantially neutral pH. | |
| 11. The method of preparation of the polymer product, as shown in this Example 9, produces a random arrangement of copolymers. | |
| 12. The weight percent ACTIVE is the total weight of ACMO, NaAMPS, AA, SSS, TEPA, humate and SP as a percent of the total weight of the entire reaction mass. | |

Example 10

Cement slurries were prepared and tested for fluid loss, consistency and rheological properties in accordance with the provisions of API SPEC 10. Polymer B, shown in Table 8, above, was employed in the slurries referred to in Tables 9 and 10, below. The quantities of "Polymer" and mix water referred to in Tables 9 and 10 are expressed as percent by weight of dry API CLASS H cement unless otherwise noted.

The mix water employed, unless otherwise noted, was potable city tap water as available in Mesquite, Tex. In some runs the mix water included other ingredients which are referred to as "Additive." The quantity of "Additive" is expressed as percent by weight of mix water.

With respect to data included in Tables 9 and 10, unless otherwise noted: Fluid Loss was determined in accordance with the provisions of API Spec 10, Appendix F. Consistency was determined in accordance with the provisions of API Spec 10, Section 9. Rheological properties were determined in accordance with the provisions of API Spec 10, Appendix H using a Fann Rotational Viscometer OFI Model 800 with rotor sleeve R1, bob B1 and loaded with a 1 inch spring.

TABLE 9

POLYMER B, FROM EXAMPLE 9 and TABLE 8
POLYMER 2, FROM EXAMPLE 5 and TABLE 4
POLYMER 3, FROM EXAMPLE 5 and TABLE 4

38 PERCENT MIX WATER (4.3 gal water/94 lb sack cement)

| | Run # | | | | | | | | |
|---|---|---|---|---|---|---|---|---|---|
| | 52 | 53 | 54 | 55 | 56 | 57 | 58 | 59 | 60 |
| Polymer B, wt % | 1.0 | | | 1.0 | | | 1.0 | | |
| Polymer 2, wt % | | 1.0 | | | 1.0 | | | 1.0 | |
| Polymer 3, wt % | | | 1.0 | | | 1.0 | | | 1.0 |
| Retarder[1] % | 0.5 | 0.5 | 0.5 | 0.5 | 0.5 | 0.5 | 0.5 | 0.5 | 0.5 |
| NaCl % | 18 | 18 | 18 | 37 | 37 | 37 | | | |
| Silica Flour % | 35 | 35 | 35 | 35 | 35 | 35 | | | |
| Temp deg F. | 180 | 180 | 180 | 180 | 180 | 180 | 180 | 180 | 180 |
| Fluid Loss cc/30 min | 32 | 54 | 32 | 38 | 42 | 36 | 20 | 26 | 22 |
| Consistency | | | | | | | | | |
| initial, ABc | 16 | 10 | 12 | 17 | 15 | 16 | 15 | 17 | 22 |
| @ 20 min, ABc | 15 | 10 | 15 | 11 | 11 | 11 | 10 | 11 | 13 |
| Rheology | | | | | | | | | |
| 600 rpm | 300+ | 330+ | 330+ | 330+ | 330+ | 330+ | 300+ | 330+ | 330+ |
| 300 rpm | 301 | 238 | 330+ | 225 | 207 | 197 | 243 | 160 | 266 |
| 200 rpm | 225 | 175 | 281 | 152 | 143 | 134 | 171 | 110 | 190 |
| 100 rpm | 143 | 101 | 177 | 82 | 77 | 72 | 95 | 58 | 108 |

TABLE 9-continued

POLYMER B, FROM EXAMPLE 9 and TABLE 8
POLYMER 2, FROM EXAMPLE 5 and TABLE 4
POLYMER 3, FROM EXAMPLE 5 and TABLE 4

| 6 rpm | 21 | 9 | 32 | 5 | 5 | 5 | 7 | 4 | 8 |
|---|---|---|---|---|---|---|---|---|---|
| 3 rpm | 15 | 6 | 24 | 3 | 3 | 3 | 4 | 2 | 4 |

41.7 PERCENT MIX WATER (4.7 gal water/94 lb sack cement)

|  | Run # | | |
|---|---|---|---|
|  | 60 | 61 | 62 |
| Polymer B, wt % | 1.2 | | |
| Polymer 2, wt % | | 1.2 | |
| Polymer 3, wt % | | | 1.2 |
| Retarder[1] % | 1.0 | 1.0 | 1.0 |
| NaCl % | 37 | 37 | 37 |
| Silica Flour % | 35 | 35 | 35 |
| Temp deg F. | 180 | 180 | 180 |
| Fluid Loss[2] cc/30 min | 36 | 60 | 30 |
| Consistency | | | |
| initial, ABc | 13 | 10 | 14 |
| @20 min, ABc | 10 | 6 | 10 |
| Rheology | | | |
| 600 rpm | 330+ | 161 | 330+ |
| 300 rpm | 210 | 84 | 232 |
| 200 rpm | 151 | 57 | 165 |
| 100 rpm | 84 | 31 | 93 |
| 6 rpm | 6 | 6 | 8 |
| 3 rpm | 4 | 5 | 4 |

Footnotes Table 9:
1. Calcium Lignosulfonate.
2. Fluid loss conducted at 308° F. with top of cell at 1500 psi and bottom ot cell at 500 psi

Example 11

Cement slurries were prepared and tested for thickening time, zero gel time, transition time and compressive strength. Polymer B shown in Table 8, above, was employed in the slurries referred to in Table 10, below.

The quantities of "Polymer," mix water, accelerator and retarder, referred to in Table 10 are expressed as percent by weight of dry API CLASS H cement unless otherwise noted. The retarder employed, unless otherwise noted, was sodium lignosulfonate. The accelerator employed, unless otherwise noted, was calcium chloride.

The mix water employed, unless otherwise noted, was potable city tap water.

Unless otherwise noted, Thickening Time was determined in accordance with the provisions of API Spec 10. Zero Gel Time and Transition Time were determined in accordance with Sabins et al, mentioned previously, and compressive strength was measured with an Ultrasonic Cement Analyzer (UCA).

TABLE 10

POLYMER B, FROM EXAMPLE 9 and TABLE 8
POLYMER 2, FROM EXAMPLE 8 and TABLE 7
40 PERCENT MIX WATER

|  | Run # | |
|---|---|---|
|  | 63 | 64 |
| Polymer 2, % | 0.00 | 0.60 |
| Polymer B, % | 0.60 | 0.00 |

TABLE 10-continued

POLYMER B, FROM EXAMPLE 9 and TABLE 8
POLYMER 2, FROM EXAMPLE 8 and TABLE 7
40 PERCENT MIX WATER

|  | Run # | |
|---|---|---|
|  | 63 | 64 |
| Retarder, % | 0.20 | 0.15 |
| Accelerator, % | 0.00 | 0.00 |
| Temp deg F. | 140 | 140 |
| Zero Gel Time, HRS:MIN | 4:11 | 6:12 |
| Transition Time, HRS:MIN | 0:33 | 0:22 |

Footnotes Table 10: Retarder was 0.2% sodium lignosulfonate and 0.2% tartartic acid.

What is claimed is:

1. A method of cementing a pipe in a borehole which penetrates a subterranean formation, said method comprising:
    forming a cement composition;
    placing said cement composition in the annulus between said pipe and said formation;
    permitting said cement composition to set in said annulus whereby a hardened mass of cement is produced;
    wherein said cement composition is a slurry comprised of water, hydraulic cement and an additive made by polymerizing monomer reactants comprised of a vinylamide morpholine derivative and a styrene sulfonic acid salt in the presence of an effective quantity of humate;

wherein said vinylamide morpholine derivative is selected from compounds represented by the first general formula

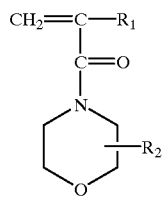

wherein $R_1$ is —H or —$CH_3$ and $R_2$ is —H, —$CH_3$ or —$CH_2CH_3$ and is positioned on any one of the four carbons in the morpholine ring; and said styrene sulfonic acid salt is selected from compounds represented by the second general formula

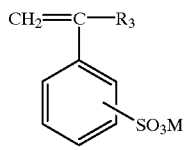

wherein $R_3$ is —H and M is —Na, —K, —$NH_4$, or —Ca½.

2. The method of claim 1 wherein said additive is present in said cement composition in an amount in the range of from about 0.1 to about 2.0 percent additive by weight of dry hydraulic cement in said composition.

3. The method of claim 2 wherein the mole ratio of said vinylamide morpholine derivative to said styrene sulfonic acid salt in said additive is an amount in the range of from about 2 to about 25 moles of said vinylamide morpholine derivative per mole of said styrene sulfonic acid salt and the ratio of the total weight of said monomer reactants in said additive to the weight of said humate in said additive is an amount in the range of from about 3 to about 25 parts by total weight of said monomer reactants per 1 part by weight of said humate.

4. The method of claim 3 wherein said additive is a random copolymer of said vinylamide morpholine derivative and said styrene sulfonic acid salt.

5. The method of claim 3 wherein said additive is a random polymer of said vinylamide morpholine derivative, said styrene sulfonic acid salt and at least one third monomer selected from compounds represented the third general formula

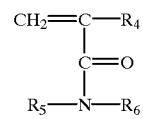

wherein $R_4$ is —H or —$CH_3$; $R_5$ is —H, —$CH_3$, —$CH_2CH_3$, —$CH(CH_3)_2$, —$C(CH_3)_3$, or —$C(CH_3)_2CH_2SO_3X$, X is —Na, —$NH_4$, or —Ca½; and $R_6$ is —H, —$CH_3$ or —$CH_2CH_3$.

6. The method of claim 4 wherein said vinylamide morpholine derivative is acryloylmorpholine and said styrene sulfonic acid salt is sodium styrene sulfonate.

7. The method of claim 5 wherein said vinylamide morpholine derivative is acryloylmorpholine, said styrene sulfonic acid salt is sodium styrene sulfonate and said third monomer is a mixture of the sodium salt of 2-acrylamido-2-methylpropanesulfonic acid and acrylamide.

8. The method of claim 3 wherein said mole ratio of said vinylamide morpholine derivative to said styrene sulfonic acid salt in said additive is an amount in the range of from about 7 to about 15 moles of said vinylamide morpholine derivative per mole of styrene sulfonic acid salt.

9. The method of claim 3 wherein said ratio of said total weight of said monomer reactants to said weight of said humate in said additive is an amount in the range of from about 5 to about 20 parts by total weight of said monomer reactants per 1 part by weight of said humate.

* * * * *